United States Patent
DeMent et al.

(10) Patent No.: US 7,370,176 B2
(45) Date of Patent: May 6, 2008

(54) SYSTEM AND METHOD FOR HIGH FREQUENCY STALL DESIGN

(75) Inventors: Jonathan James DeMent, Austin, TX (US); Kurt Alan Feiste, Austin, TX (US); Robert Alan Philhower, Valley Cottage, NY (US); David Shippy, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 117 days.

(21) Appl. No.: 11/204,414

(22) Filed: Aug. 16, 2005

(65) Prior Publication Data

US 2007/0043931 A1    Feb. 22, 2007

(51) Int. Cl.
G06F 9/30 (2006.01)
G06F 9/40 (2006.01)
G06F 15/00 (2006.01)

(52) U.S. Cl. ........................ 712/214; 712/216; 712/217; 712/218

(58) Field of Classification Search ................ 712/216, 712/214, 217, 218
See application file for complete search history.

(56) References Cited

U.S. PATENT DOCUMENTS

| | | | | |
|---|---|---|---|---|
| 5,488,729 A | * | 1/1996 | Vegesna et al. | 712/209 |
| 5,519,864 A | * | 5/1996 | Martell et al. | 712/215 |
| 5,598,546 A | * | 1/1997 | Blomgren | 712/209 |
| 6,016,543 A | * | 1/2000 | Suzuki et al. | 712/233 |
| 6,112,019 A | * | 8/2000 | Chamdani et al. | 712/214 |
| 6,145,049 A | * | 11/2000 | Wong | 710/267 |
| 6,212,626 B1 | * | 4/2001 | Merchant et al. | 712/218 |
| 6,742,111 B2 | * | 5/2004 | Soni | 712/217 |
| 2003/0163674 A1 | * | 8/2003 | Yoshimura et al. | 712/227 |
| 2004/0030867 A1 | * | 2/2004 | Arnold et al. | 712/217 |
| 2006/0224862 A1 | * | 10/2006 | Ahmed et al. | 712/214 |

OTHER PUBLICATIONS

Hennessy and Patterson "Computer Architecture A quantitive approach" 3rd edition; published: 2003; pertinent pp. A-47-A51, A57-A59, A67-A76☐☐.*
Professor David A. Patterson, "Introduction to Advanced Pipelining", Lecture 3, Spring 1998. Pertinent pp. 26-60.*

* cited by examiner

Primary Examiner—Eddie Chan
Assistant Examiner—Idriss Alrobaye
(74) Attorney, Agent, or Firm—Van Leeuwen & Van Leeuwen; D'Ann N. Rifai

(57) ABSTRACT

A system and method for a high frequency stall design is presented. An issue unit includes a first instruction stage, a second instruction stage, and issue control logic. During a first instruction cycle, the issue unit performs two tasks, which are 1) the instructions located in the first instruction stage are moved to a second instruction stage, and 2) the issue control logic determines whether to issue or stall the instructions that are moved to the second instruction stage based upon their particular instruction attributes and the issue control unit's previous state. During a second instruction cycle that immediately follows the first instruction cycle, the second instruction stage's instructions are either issued or stalled based upon the issue control logic's decision from the first instruction cycle.

6 Claims, 7 Drawing Sheets

| STATE | COMMENTS | REF. |
|---|---|---|
| Idle | 100% Ideal Throughput. | A |
| Stalled | Dependency Stall, Exception Conditions, XU Unavailable | B |
| Serialize | Single Stepping, Everything Completes Before Issue | C |
| Non-Pipelined | Issue then Stall Until Instruction Completes | D |

SYSTEM AND METHOD FOR HIGH FREQUENCY STALL DESIGN

BACKGROUND OF THE INVENTION

1. Technical Field

The present invention relates to a system and method for a high frequency stall design. More particularly, the present invention relates to a system and method for controlling instruction issuance to a backend pipeline in a high frequency, deeply pipelined system.

2. Description of the Related Art

Computer system designs incorporate a multitude of design approaches in order to achieve maximum performance. Once such design approach is pipelining. A pipeline is an implementation technique whereby multiple instructions are overlapped in execution. Without a pipeline, a processor fetches an instruction from memory, performs the operation corresponding to the instruction, and then fetches another instruction. Using a non-pipelined approach, the processor's arithmetic units are idle when the processor fetches instructions.

With pipelining, however, the computer system fetches instructions and stages them in a buffer while the processor performs arithmetic operations. Fetching and staging instructions is continuous, which results is an increase in the number of instructions that may be performed during a given time period.

Computer processor pipelining is typically divided into a front-end pipeline and a backend pipeline. The front-end pipeline includes instruction units, such as a fetch unit and an issue unit. The backend pipeline includes execution units, such as a fixed-point unit and a floating-point unit. The front-end pipeline's issue unit typically includes issue control logic for controlling instruction issuance to the backend pipeline.

A challenge found is that in high frequency, deeply-pipelined designs, implementing the issue control logic in order to meet timing constraints is extremely difficult because it requires decision feedback from a previous instruction cycle. In addition, the issue control logic complexity increases when the backend pipeline includes a multitude of execution units, each with varying restrictions and rules that the issue control logic follows.

Furthermore, the issue control logic design complexity multiplies for dual-issue systems. A dual-issue system allows two instructions to flow through the pipeline and issue simultaneously, barring any resource conflicts. In low Fan Out 4 (FO4) designs, such as 10FO4 to 16FO4, a dual-issue processor requires extremely efficient issue control logic in order to effectively control high frequency operation.

What is needed, therefore, is a system and method that controls instruction issuance in a high-frequency, deeply pipelined design in a very efficient manner in order to meet low FO4 design considerations.

SUMMARY

It has been discovered that the aforementioned challenges are resolved using a system and method to determine whether to issue/stall an instruction, and issuing/stalling the instruction in two instruction cycles based upon defined issue control logic states. Issue control logic transitions between four states while managing instruction issuance, which are an "idle" state, a "stalled" state, a "serialize" state, and a "non-pipelined" state. The issue control logic uses its previous state, instruction attributes, and other system signals to determine when to issue instructions to a backend pipeline.

An issue unit includes a first instruction stage, a second instruction stage, and issue control logic. The issue unit receives instructions from a dependency unit and loads the instructions into the first instruction stage.

The first instruction stage and the second instruction stage may each include two instruction locations for use with a dual-issue system. During a first instruction cycle, the issue unit performs two tasks, which are 1) the instructions located in the first instruction stage are moved to a second instruction stage, and 2) the issue control logic determines whether to issue or stall the instructions that are moved to the second instruction stage based upon their particular instruction attributes and the issue control unit's previous state.

The instruction attributes include a dependency stall signal, a complete before issue signal, and a complete after issue signal for each instruction. The dependency stall signal signifies whether an instruction has dependencies or whether an instruction requires a computed result of a previously issued instruction that is not yet available. The complete before issue signal signifies whether the issue control logic should ensure that all instructions executing on an execution unit are complete before issuing the instruction. And, the complete after issue signal signifies whether the issue control logic should issue the instruction, and then wait until it completes before issuing another instruction.

During a second instruction cycle following the first instruction cycle, the issue control logic either issues the instructions that are now located in the second instruction stage to the backend pipeline, or stalls the instructions in the second instruction stage based upon its decision during the first instruction cycle until the instructions are ready to issue (e.g., its dependencies are resolved).

When the issue control logic is in an idle state, the issue control logic analyzes instruction attributes corresponding to the instructions that are moving from the first instruction stage to the second instruction stage because, in the idle state, the instructions that were in the second instruction stage are in the process of issuing. When the issue control logic is in a stalled state, serialized state, or a non-pipelined state, the issue control logic analyzes instruction attributes corresponding to the instruction included in the second instruction stage because these instructions are the ones that are causing the issue control logic to stay out of the idle state, thereby decreasing pipeline throughput.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

FIG. 3 is a table showing various issue control logic states;

FIG. 4 is a table showing issue control logic output values based upon instruction attributes and other input signals;

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
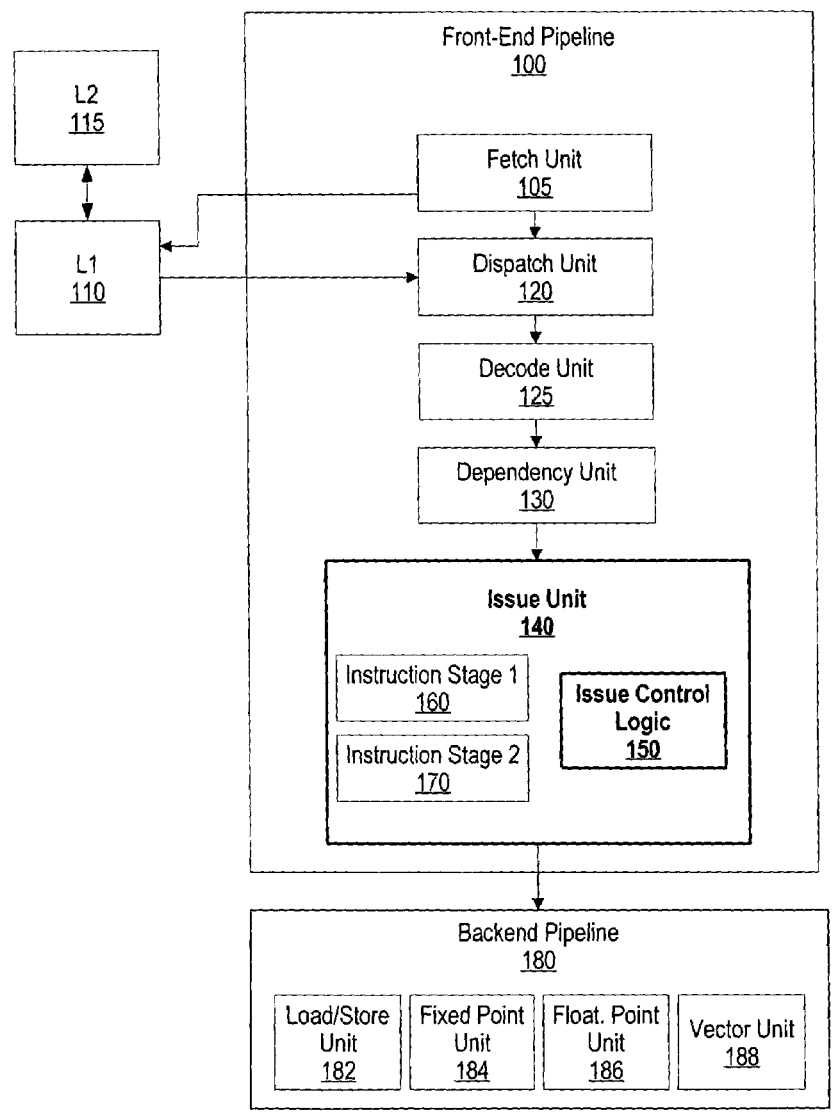
FIG. 1 is a diagram showing a front-end pipeline that includes issue control logic that manages the issuance of instructions to a backend pipeline.

FIG. 1 is a diagram showing a front-end pipeline that includes issue control logic that manages the issuance of instructions to a backend pipeline. Front-end pipeline 100 includes fetch unit 105, dispatch unit 120, decode unit 125, dependency unit 130, and issue unit 140. Fetch unit 105 fetches instructions from L2 115 and places them in L1 110. Dispatch unit 115 takes the instructions out of L1 110 and queues them for decode unit 125. Decode unit 120's responsibility is to interpret the instructions, such as whether it is an "add" or "multiply" instruction, and passes the instruction to dependency unit 130.

Dependency unit 130 checks whether an instruction has dependencies upon other instructions. For example, one instruction may require a result from a multiply instruction that has not yet completed. When dependency unit 130 determines that an instruction has dependencies, dependency unit 130 sets a dependency bit that corresponds to the instruction, which is used by issue control logic 150 for determining whether to issue or stall a particular instruction.

Issue unit 140 includes a first instruction stage (instruction stage 1 160), a second instruction stage (instruction stage 2 170), and issue control logic 150. Issue unit 140 receives an instruction from dependency unit 130 and loads the instruction into instruction stage 1 160. During a first instruction cycle, 1) the instructions located in instruction stage 1 160 are moved to instruction stage 2 170, and 2) issue control logic 150 determines whether to issue or stall the instructions that are moved to instruction stage 2 170 based upon the instructions attributes, such as whether it has dependencies.

During a second instruction cycle, issue control logic 150 either issues the instructions in instruction stage 2 to backend pipeline 180 or stalls the instructions in instruction stage 2 based upon its decision during the first instruction cycle. When the instructions issue, backend pipeline executes the instructions using one or more of its execution units, which are load/store unit 182, fixed point unit 184, floating point unit 186, and vector unit 188 (see FIGS. 2-5, and corresponding text for further details regarding issuance determination).

Issue control logic 150 transitions between four states while managing instructions, which are an "idle" state, a "stalled" state, a "serialize" state, and a "non-pipelined" state. When issue control logic 150 is in an idle state, it analyzes instruction attributes corresponding to the instruction that is moving from instruction stage 1 160 to instruction stage 2 170. When issue control logic 150 is in a stalled state, serialized state, or a non-pipelined state, it analyzes instruction attributes corresponding to the instruction included in instruction stage 2 170 because these instructions are the ones that are causing issue control logic 150 to not be in an idle state (see FIGS. 2-4 and corresponding text for further details).

Figure 2:
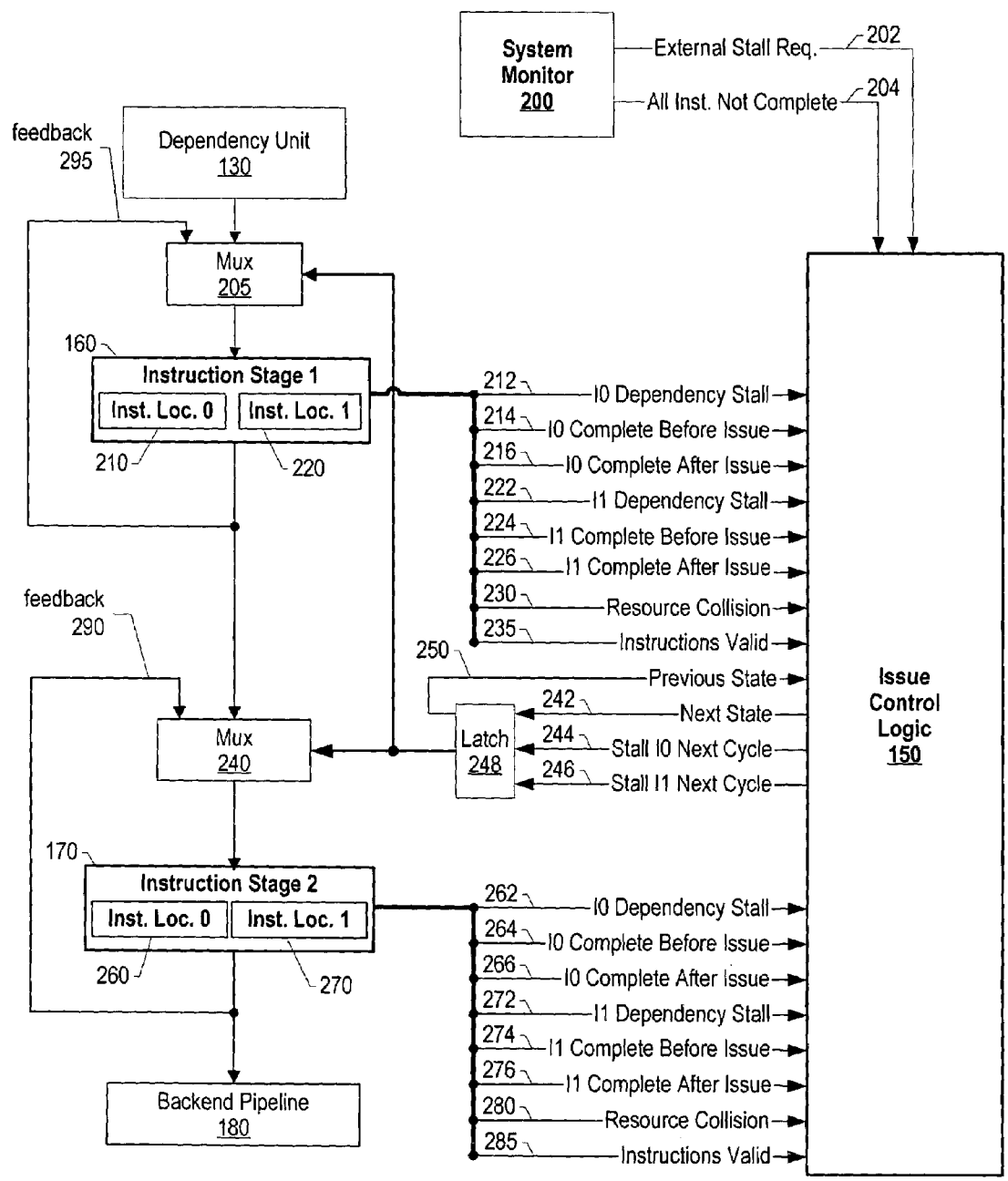
FIG. 2 is a diagram showing issue control logic receiving instruction attributes and controlling instruction issuance to a backend pipeline based upon the instruction attributes.

FIG. 2 is a diagram showing issue control logic receiving instruction attributes and controlling instruction issuance to a backend pipeline based upon the instruction attributes. Issue control logic 150 receives various inputs from instruction stage 1 160, instruction stage 2 170, and system monitor 200. In turn, issue control logic 150 provides direction for issuing instructions to backend pipeline 180 or stalling instructions at instruction stage 2 170. Instruction stage 1 160, instruction stage 2 170, issue control logic 150, and backend pipeline 180 are the same as that shown in FIG. 1.

System monitor 200 provides external stall request signal 202 and "all instructions not complete" signal 204 to issue control logic 150. External stall request signal 202 informs issue control logic 150 to stall instructions due to circumstances other than what is in issue control logic 150's control, such as exhaustion of a load miss queue in a load/store execution unit. All instructions not complete signal 204 informs issue control logic 150 when instructions processed by backend pipeline 180 are complete. Issue control logic 150 uses these two signals during its analysis of state determination (see FIG. 4 and corresponding text for further details).

During operation, dependency unit 130 provides instructions to instruction stage 1 160 through multiplexer 205. Multiplexer 205 is controlled by the output of latch 248 and feeds back upon itself (feedback 295) in situations when instructions halt (see below for further details). FIG. 2 shows that instruction stage 1 160 supports dual-issue of instructions in which it stores an "instruction 0" in instruction location 0 210 and an "instruction 1" in instruction location 1 220. As one skilled in the art can appreciate, the invention described herein applies to single-issue and multiple-issue systems as well.

During a first instruction cycle, instruction stage 1 160's instructions are moved to instruction stage 2 170. The instruction located in instruction location 0 210 is moved to instruction location 0 260, and the instruction located in instruction location 1 220 is moved to instruction location 1 270. Also during the first instruction cycle, issue control logic 150 analyzes signals 212 through 235, which are instruction attributes that correspond to the instructions that are moving to instruction stage 2 170.

Signals 212 through 216 correspond to instruction location 0 210's instruction. Instruction 0 dependency stall signal 212 signifies whether the instruction has dependencies. Instruction 0 complete before issue 214 signifies whether issue control logic 150 should ensure that all instructions are complete before issuing the instruction. Instruction 0 complete after issue 216 signifies whether issue control logic 150 should issue the instruction, and then wait until it completes before issuing another instruction.

Signals 222 through 226 correspond to instruction location 1 220's instruction and are similar to signals 212 through 216 discussed above. Signal 230 indicates whether a resource collision results from both instructions in instruction stage 1 160. For example, both instructions may be "add" instructions that require a fixed-point execution unit. Signal 235 indicates whether both of the instructions are valid.

Issue control logic 150 also receives previous state 250 from latch 248, which is issue control logic 150's state from a previous instruction cycle. For example, during the previous instruction cycle, issue control logic 150 may be in "serialize" state and, therefore, on the next instruction cycle, previous state 250 signifies the serialize state.

During the first instruction cycle analysis, when previous state 250 signifies an idle state, issue control logic 150 uses signals 212 through 235 and external stall request 202 to determine its next state. Issue control logic 150 outputs next state 242, stall instruction 0 next cycle 244, and stall instruction 1 next cycle 246 to latch 248, which configures multiplexer 240 and multiplexer 205 for the next instruction cycle, which is a "second" instruction cycle.

During the second instruction cycle, when stall instruction 0 next cycle 244 is active, multiplexer 240 selects feedback 290 for instruction location 0 260, which re-loads instruction location 0 260's instruction. Likewise, multiplexer 205 selects feedback 295 for instruction location 0 210, which re-loads instruction location 0 210's instruction. When stall instruction 0 next cycle 244 is not active, instruction location 0 260's instruction issues to backend pipeline 180 and another instruction is received from instruction stage 1 160 through multiplexer 240. Similarly, when stall instruction 0 next cycle 244 is not active, multiplexer 205 selects dependency unit 130 as an input and provides another instruction to instruction stage 1 160 from dependency unit 130. Stall instruction 1 next cycle 246 has the same effect for instruction location 1 270's instruction.

When previous state 250 signifies a stalled state, a serialize state, or a non-pipelined state, issue control logic 150 uses signals 262 through 285, external stall request signal 202, and all instructions not complete signal 204 to determine its next state. This is due to the fact that one or more of the instructions that are located in instruction stage 2 170 caused issue control logic 150 to be in such state. For example, during the first instruction cycle, an instruction with dependencies loads into instruction stage 2 170, and issue control logic 150 determines that the instruction should not issue, and therefore stall in instruction stage 2 170, until its dependencies are complete. Continuing with this example, issue control logic 150 monitors signals 262-285 in order to determine when to issue the stalled instruction (see FIG. 4 and corresponding text for further details).

Signals 262 through 266 correspond to the instruction included in instruction location 0 210 and signals 272 through 276 correspond to the instruction included in instruction location 1 270, which are both similar to signals 212 through 216 discussed above. Signal 280 indicates whether a resource collision results from the two instructions. For example, both instructions may be "add" instructions, and signal 285 indicates whether both of the instructions are valid.

Figure 4:
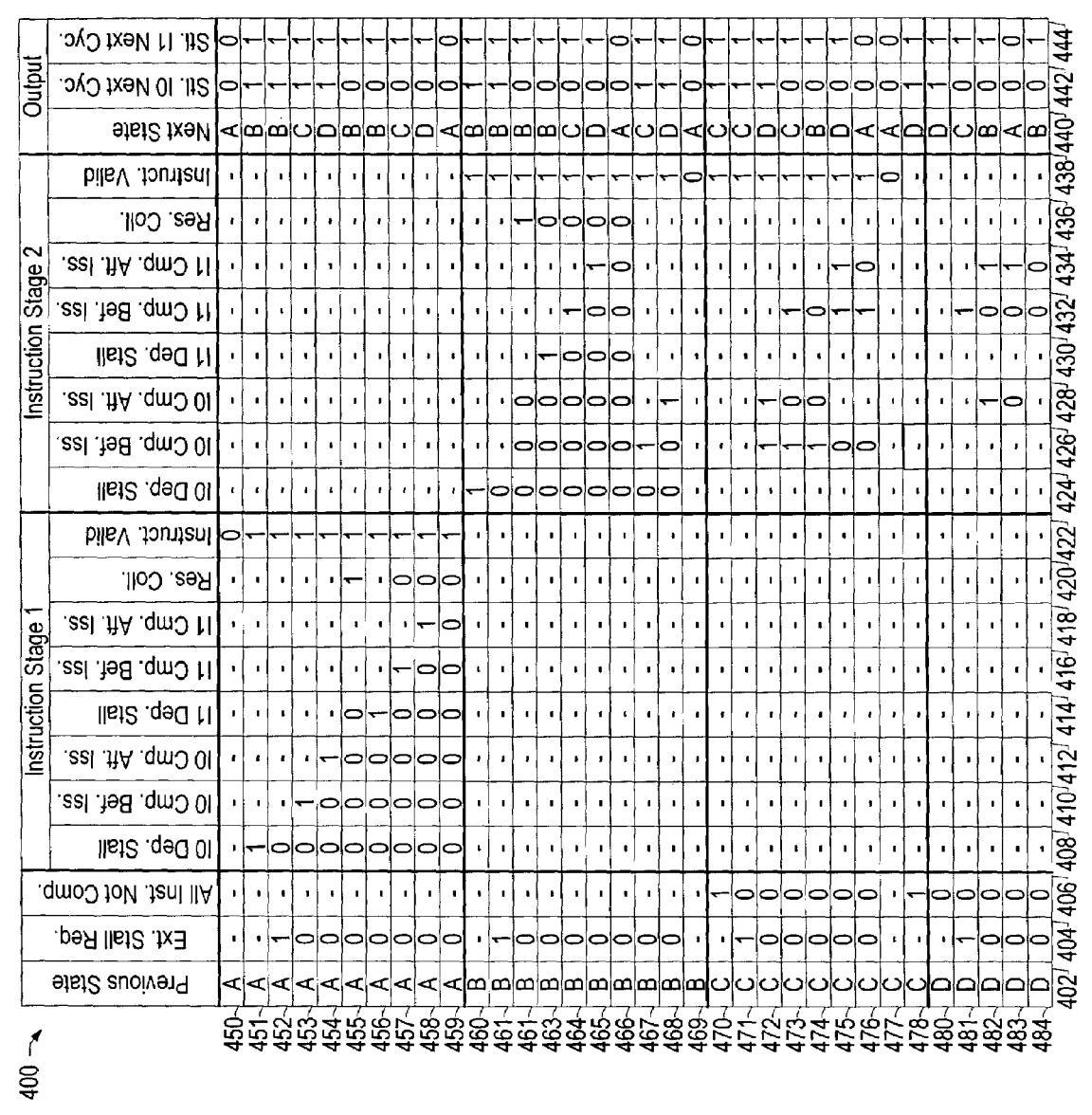

FIG. 3 is a table showing various issue control logic states. Issue control logic receives various inputs and transitions states based upon the inputs. Issue control logic uses two instruction stages to issue or stall an instruction. In the first instruction stage, the issue control logic determines whether to issue the instruction or stall the instruction. The instruction is also moved to a second instruction stage on the first clock cycle. On the second clock cycle, the issue control logic either issues the instruction or stalls the instruction. Table 300 includes four states in column 310, which are an idle state, a stalled state, a serialize state, and a non-pipelined state. Column 320 shows comments corresponding to each state, and column 330 includes a reference for each state that is used for a table that is shown in FIG. 4.

Row 340 includes information pertaining to the idle state. In the idle state, the pipeline does not have stalls, dependencies, serializations, or non-pipelined instructions, and is at 100% throughput. In the idle state, issue control logic focuses on instruction attributes corresponding to an instruction that is located in the first instruction stage because these attributes may cause the issue control logic to transition out of the idle state and into one of the other states. Column 330 shows that reference "A" in FIG. 4 corresponds to the idle state.

Row 350 includes information pertaining to the stalled state. The issue control logic transitions to the stalled state for reasons such as when an instruction has a dependency stall. For example, the instruction may require a fixed-point unit and the fixed-point unit is still executing a previous instruction. In the stalled state, the issue control logic focuses on instruction attributes corresponding to instructions that are loaded in the second instruction stage because it is these instructions that may place the issue control logic out of the stall state. Column 330 shows that reference "B" in FIG. 4 corresponds to the stalled state.

Row 360 includes information pertaining to the serialize state. The issue control logic transitions to the serialize state in situations such as debug mode, whereby the instructions are single stepped and everything completes for one instruction before another instruction issues. The serialize state mode also handles context synchronizing instructions that require all prior issued instructions to complete before they execute. In addition, software developers may use this mode to improve performance by studying, in a serial fashion, instruction execution latencies when a pipeline brings difficulty in identifying an instruction that causes performance degradation. In the serialize state, the issue control logic focuses on instruction attributes corresponding to instructions that are loaded in the second instruction stage because it is these instructions that may place the issue control logic out of the serialize state. Column 330 shows that reference "C" in FIG. 4 corresponds to the stalled state.

Row 370 includes information pertaining to the non-pipelined state. The issue control logic transitions to the non-pipelined state in situations when an instruction should issue and then stall until the instruction completes, which is a mirror of the serialize state. This state is required for instructions that are difficult or too costly to execute in a pipelined fashion, such as "divide" or "square root." In the non-pipelined state, an instruction issues to an execution unit, which takes a variable amount of time to complete the instruction. During this time, the issue control unit cannot interrupt the execution unit by sending another instruction. When the execution unit completes the instruction, the execution unit resumes operation in the normal pipelined fashion.

The non-pipelined state differs from the serialized state in that the instruction first issues to an execution unit and then the issue control unit stalls and waits for the instruction to complete. In the non-pipelined state, the issue control logic focuses on instruction attributes corresponding to instructions that are loaded in the second instruction stage because it is these instructions that may place the issue control logic out of the non-pipelined state. Column 330 shows that reference "D" in FIG. 4 corresponds to the non-pipelined state.

FIG. 4 is a table showing issue control logic output values based upon instruction attributes and other input signals. Table 400 includes an embodiment of issue control logic state transitions that has been optimized for particular control logic. As one skilled in the art can appreciate, different tables may be established using the invention described herein for other issue control logic optimization embodiments. References "A," "B," "C," and "D" correspond to an idle state, a stalled state, a serialize state, and a non-pipeline state, respectively (see FIG. 3 and corresponding text for further details).

Table 400 includes columns 402 through 406. Column 402 includes previous state values, which is the value of the issue control logic during a previous instruction cycle. Column 404 includes external stall request values, which corresponds to a system monitor informing the issue control logic to stall. Column 406 includes all instructions not complete values, which is received from the system monitor that signifies that instructions are being processed in one of the backend pipeline units.

Columns 408 through 422 correspond to signals 212 through 235, respectively, that are received from instruction stage 1 160 that is shown in FIG. 2. Columns 424 through 438 correspond to signals 262 through 285, respectively, that are received from instruction stage 2 170 that is shown in FIG. 2.

Table 400 includes output columns 440 through 444, which correspond to output signals 242 through 246, respectively, shown in FIG. 2. Column 440 includes a list of next state values, which is determined by the issue control logic based upon the values included in columns 402 through 438. Column 442 identifies whether to stall an instruction located in instruction location 0 on the next instruction cycle based upon the values included in columns 402 through 438. And, column 444 identifies whether to stall an instruction located in instruction location 1 on the next instruction cycle based upon the values included in columns 402 through 438.

Table 400 includes rows 450 through 484, which are segmented by "previous" states, and include the issue control logic's next state (column 440). Rows 450-459 correspond to when the issue control logic's previous state is an "idle" state (state "A"). For example, row 451 shows that, when in the idle state and an instruction located in instruction location 0 has a dependency stall (column 408), that the issue control logic's next state is a stalled state "B" (column 440), and that the instructions included in instruction location 0 and instruction location 1 should stall on the next instruction cycle (columns 442 and 444).

As can be seen, when the issue control logic is in idle state, the issue control logic analyzes signals received from instruction stage 1 (columns 408-422) and is not concerned with signals received from instruction stage 2 (columns 424-438).

Rows 460-469 correspond to when the issue control logic's previous state is a stalled state (state "B"). For example, row 460 shows that, when in the stalled state and an instruction included in instruction location 0 still has a dependency stall (column 424), that the issue control logic's next state remains a stalled state "B" (column 440), and that the instructions included in instruction location 0 and instruction location 1 should continue to stall on the next instruction cycle (columns 442 and 444).

Rows 470-478 correspond to when the issue control logic's previous state is a serialize state (state "C"). For example, row 470 shows that, when in the serialize state and all instructions are not complete (column 406) and the instructions are valid (column 438), that the issue control logic's next state remains a serialize state "C" (column 440). In addition, the instructions included in instruction location 0 and instruction location 1 should continue to stall on the next instruction cycle (columns 442 and 444).

Rows 480-484 correspond to when the issue control logic's previous state is in a non-pipelined state (state "D"). For example, row 481 shows that when the issue control logic receives an external stall request (column 404), all of the instructions are complete (column 406), and the instruction in instruction stage 2's instruction location 1 has a complete before issue signal (column 432), that the issue control logic's next state transitions to a serialize state "C" (column 440). In addition, the instruction included in instruction location 0 should issue, while the instruction included in instruction location 1 should stall on the next instruction cycle (columns 442 and 444).

Figure 5:
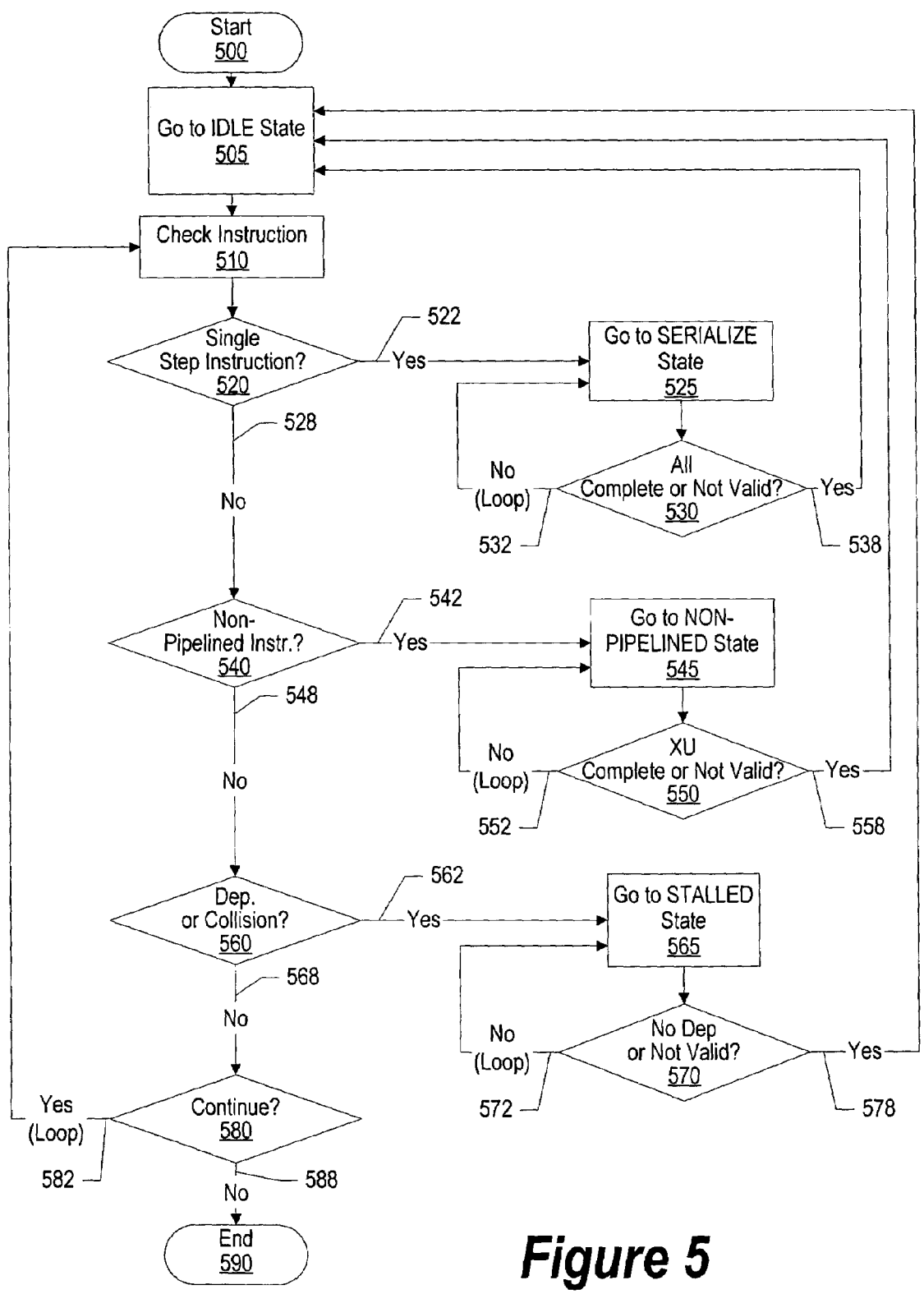
FIG. 5 is a flowchart showing steps taken in issue control logic state determination based upon instruction attributes.

FIG. 5 is a flowchart showing steps taken in issue control logic state determination based upon instruction attributes. Issue control logic transitions between four states based upon instruction attributes, the issue control logic's previous state, and external signals. For the sake of simplicity, the flowchart shown in FIG. 5 represents a single-issue system, and not a dual-issue system such as that shown in FIGS. 2 and 4.

Processing commences at 500, whereupon processing enters an idle state at step 505. The idle state is a state that allows 100% throughput, and there are no dependencies, no serializations, and no non-pipelined instructions. At step 510, processing checks instruction attributes for an instruction that is located in a first instruction stage that is in process of being transferred to a second instruction stage. Since the issue control logic is in idle state, the issue control logic focuses on instruction attributes corresponding to the instruction in the first instruction stage, and a determination is made as to whether the instruction is a single step instruction by analyzing one of the control bits that are associated with the instruction (decision 520).

If the instruction is a single step instruction, decision 520 branches to "Yes" branch 522 whereupon processing transitions to a "Serialize" state at step 525. The serialize state is a state in which the pipeline single steps instructions, and all the instructions complete before issuing the next instruction.

Once in the serialize state, processing monitors the instruction that is now in the second instruction stage. A determination is made as to whether all if the instructions corresponding to the instruction have completed or whether the instruction is not valid (decision 530). If all of the instructions have not completed and the instruction is valid, decision 530 branches to "No" branch 532 which loops back and stays in the serialize state. This looping continues until all of the instructions complete or the instruction becomes invalid, at which point decision 530 branches to "Yes" branch 538 whereupon processing transitions back to the idle state.

If the instruction is not a single step instruction, decision 520 branches to "No" branch 528 whereupon a determination is made as to whether the instruction is a non-pipelined instruction by analyzing one of the control bits that are associated with the instruction (decision 540). If the instruction is a non-pipelined instruction, decision 540 branches to "Yes" branch 542 whereupon processing transitions to a "Non-Pipelined" state at step 545. The non-pipelined state is a state in which an instruction issues and then stalls until all instructions are complete.

Once in the non-pipelined state, processing monitors the instruction that is in the second instruction stage. A determination is made as to whether an execution unit has completed the instruction or whether the instruction is not valid (decision 550). If the execution unit has not completed all of the instructions and the instruction is valid, decision 550 branches to "No" branch 552, which loops back and stays in the non-pipelined state. This looping continues until the execution unit completes all of the instructions or the instruction becomes invalid, at which point decision 550 branches to "No" branch 558 whereupon processing transitions back to the idle state.

If the instruction is not a non-pipelined instruction, decision 540 branches to "No" branch 548 whereupon a determination is made as to whether the instruction has dependencies or associated collisions by analyzing one of the control bits that are associated with the instruction (decision 560). If the instruction has dependencies or associated collisions, decision 560 branches to "Yes" branch 562 whereupon processing transitions to a "Stalled" state at step 565. The stall state is a state in which processing stalls the instruction until dependencies and associated collisions are resolved.

Once in the stalled state, processing monitors the instruction that is in the second instruction stage. A determination is made as to whether the dependencies and associated collisions are resolved or whether the instruction is not valid (decision 570). If the dependencies and associated collisions are not resolved and the instruction is valid, decision 570 branches to "No" branch 572, which loops back and stays in the stalled state. This looping continues until the dependencies and associated collisions are resolved or the instruction becomes invalid, at which point decision 570 branches to "Yes" branch 578 whereupon processing transitions back to the idle state.

A determination is made as to whether to continue processing (step 580). If processing should continue, decision 580 branches to "Yes" branch 582 whereupon processing loops back to check another instruction. This looping continues until processing should terminate, at which point decision 580 branches to "No" branch 588 whereupon processing ends at 590.

Figure 6:
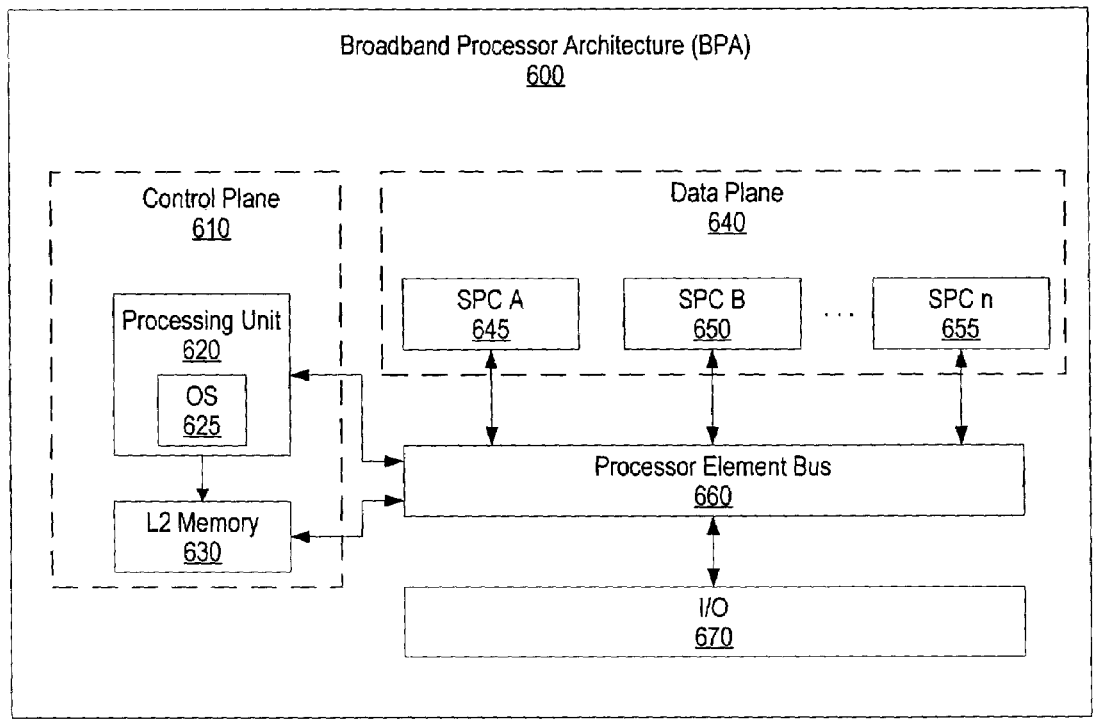
FIG. 6 is a block diagram of an information handling system capable of implementing the present invention.

FIG. 6 illustrates an information handling system, which is a simplified example of a computer system capable of performing the computing operations described herein. Broadband processor architecture (BPA) 600 includes a plurality of heterogeneous processors, a common memory, and a common bus. The heterogeneous processors are processors with different instruction sets that share the common memory and the common bus. For example, one of the heterogeneous processors may be a digital signal processor and the other heterogeneous processor may be a microprocessor, both sharing the same memory space.

BPA 600 sends and receives information to/from external devices through input output 670, and distributes the information to control plane 610 and data plane 640 using processor element bus 660. Control plane 610 manages BPA 600 and distributes work to data plane 640.

Control plane 610 includes processing unit 620, which runs operating system (OS) 625. For example, processing unit 620 may be a Power PC core that is embedded in BPA 600 and OS 625 may be a Linux operating system. Processing unit 620 manages a common memory map table for BPA 600. The memory map table corresponds to memory locations included in BPA 600, such as L2 memory 630 as well as non-private memory included in data plane 640.

Data plane 640 includes Synergistic Processing Complex's (SPC) 645, 650, and 655. Each SPC is used to process data information and each SPC may have different instruction sets. For example, BPA 600 may be used in a wireless communications system and each SPC may be responsible for separate processing tasks, such as modulation, chip rate processing, encoding, and network interfacing. In another example, each SPC may have identical instruction sets and may be used in parallel to perform operations benefiting from parallel processes. Each SPC includes a synergistic processing unit (SPU). An SPU is preferably a single instruction, multiple data (SIMD) processor, such as a digital signal processor, a microcontroller, a microprocessor, or a combination of these cores. In a preferred embodiment, each SPU includes a local memory, registers, four floating-point units, and four integer units. However, depending upon the processing power required, a greater or lesser number of floating points units and integer units may be employed.

SPC 645, 650, and 655 are connected to processor element bus 660, which passes information between control plane 610, data plane 640, and input/output 670. Bus 660 is an on-chip coherent multi-processor bus that passes information between I/O 670, control plane 610, and data plane 640. Input/output 670 includes flexible input-output logic which dynamically assigns interface pins to input output controllers based upon peripheral devices that are connected to BPA 600.

Figure 7:
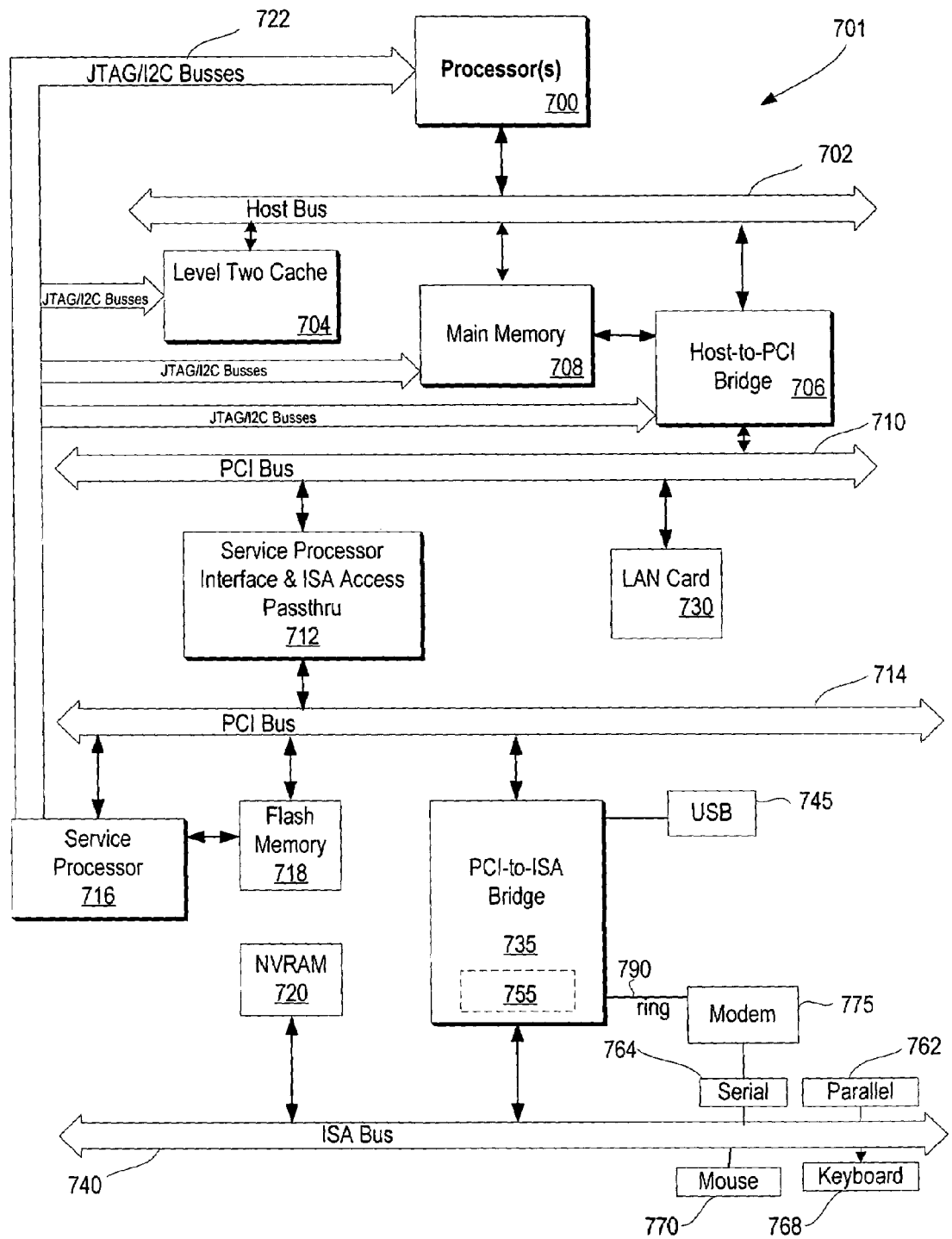
FIG. 7 is another block diagram of an information handling system capable of implementing the present invention.

FIG. 7 illustrates information handling system 701 which is another simplified example of a computer system capable of performing the computing operations described herein. Information handling system 701 includes processor 700 which is coupled to host bus 702. A level two (L2) cache memory 704 is also coupled to host bus 702. Host-to-PCI bridge 706 is coupled to main memory 708, includes cache memory and main memory control functions, and provides bus control to handle transfers among PCI bus 710, processor 700, L2 cache 704, main memory 708, and host bus 702. Main memory 708 is coupled to Host-to-PCI bridge 706 as well as host bus 702. Devices used solely by host processor(s) 700, such as LAN card 730, are coupled to PCI bus 710. Service Processor Interface and ISA Access Pass-through 712 provides an interface between PCI bus 710 and PCI bus 714. In this manner, PCI bus 714 is insulated from PCI bus 710. Devices, such as flash memory 718, are coupled to PCI bus 714. In one implementation, flash memory 718 includes BIOS code that incorporates the necessary processor executable code for a variety of low-level system functions and system boot functions.

PCI bus 714 provides an interface for a variety of devices that are shared by host processor(s) 700 and Service Processor 716 including, for example, flash memory 718. PCI-to-ISA bridge 735 provides bus control to handle transfers between PCI bus 714 and ISA bus 740, universal serial bus (USB) functionality 745, power management functionality 755, and can include other functional elements not shown, such as a real-time clock (RTC), DMA control, interrupt support, and system management bus support. Nonvolatile RAM 720 is attached to ISA Bus 740. Service Processor 716 includes JTAG and I2C busses 722 for communication with processor(s) 700 during initialization steps. JTAG/I2C busses 722 are also coupled to L2 cache 704, Host-to-PCI bridge 706, and main memory 708 providing a communications path between the processor, the Service Processor, the L2 cache, the Host-to-PCI bridge, and the main memory. Service Processor 716 also has access to system power resources for powering down information handling system 701.

Peripheral devices and input/output (I/O) devices can be attached to various interfaces (e.g., parallel interface 762, serial interface 764, keyboard interface 768, and mouse interface 770 coupled to ISA bus 740. Alternatively, many I/O devices can be accommodated by a super I/O controller (not shown) attached to ISA bus 740.

In order to attach computer system 701 to another computer system to copy files over a network, LAN card 730 is coupled to PCI bus 710. Similarly, to connect computer system 701 to an ISP to connect to the Internet using a telephone line connection, modem 775 is connected to serial port 764 and PCI-to-ISA Bridge 735.

While the information handling systems described in FIGS. 6 and 7 are capable of executing the processes described herein, these computer systems are simply examples of computer systems. Those skilled in the art will appreciate that many other computer system designs are capable of performing the processes described herein, such as gaming systems, imaging systems, seismic computer systems, and animation systems.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method comprising:
    transferring, on a first instruction cycle, an instruction from a first instruction stage to a second instruction stage, wherein the first instruction stage and the second instruction stage are both included within an issue unit, the instruction corresponding to instruction attributes that comprise a dependency stall signal that signifies whether the instruction is dependent upon a different instruction, a complete before issue signal that signifies whether to wait until other instructions that are currently executing on an execution unit are complete before issuing the instruction, a complete after issue signal that signifies whether to issue the instruction and wait until the instruction completes before issuing a different instruction, a resource collision signal that signifies whether a resource collision results from the instruction and another instruction, and an instruction valid signal that signifies whether the instruction and other transferred instructions are valid;
    determining, before commencing a second instruction cycle immediately following the first instruction cycle, whether to issue the instruction based upon the dependency stall signal, the complete before issue signal, the complete after issue signal, the resource collision signal, and the instruction valid signal, the determining performed by issue control logic included within the issue unit;
    issuing, during the second instruction cycle, the instruction in response to the determining to issue the instruction, the issuing performed by the issue control logic; and
    stalling, during the second instruction cycle, the instruction in response to the determining to not issue the instruction, the stalling performed by the issue control logic.

2. The method of claim 1 further comprising:
    monitoring, in response to the stalling, the instruction attributes from the second instruction stage in order to determine when to issue the instruction.

3. The method of claim 1 wherein the determining further comprises:
    identifying, by the issue control logic, a previous state of the issue control logic, the previous state corresponding to an instruction cycle prior to the first instruction cycle; and
    using the previous state for the determination.

4. The method of claim 1 wherein the determination results in a next state, the next state selected from the group consisting of a serialize state and a non-pipelined state.

5. The method of claim 1 further comprising:
    perform simultaneously the transferring, the issuing, and the stalling for a plurality of instructions that are dual-issue instructions.

6. The method of claim 1 further comprising:
    wherein the method is performed using a broadband processor architecture, the broadband processor architecture including a plurality of heterogeneous processors, a common memory, and a common bus; and
    wherein the plurality of heterogeneous processors use different instruction sets and share the common memory and the common bus.

* * * * *